(12) United States Patent
Patel et al.

(10) Patent No.: US 7,599,313 B2
(45) Date of Patent: Oct. 6, 2009

(54) METHOD TO SCALE HIERARCHICAL ROUTE REFLECTORS USING AUTOMATED OUTBOUND ROUTE FILTERING-LIST MECHANISM

(75) Inventors: Keyur Patel, San Jose, CA (US); Ruchi Kapoor, San Jose, CA (US); James N. Guichard, Groton, MA (US)

(73) Assignee: Cisco Technology, Inc., San Jose, CA (US)

( * ) Notice: Subject to any disclaimer, the term of this patent is extended or adjusted under 35 U.S.C. 154(b) by 820 days.

(21) Appl. No.: 11/117,223

(22) Filed: Apr. 28, 2005

(65) Prior Publication Data

US 2006/0245374 A1    Nov. 2, 2006

(51) Int. Cl.
*H04L 12/28* (2006.01)
(52) U.S. Cl. ...................................... 370/254; 370/400
(58) Field of Classification Search ..................... None
See application file for complete search history.

(56) References Cited

U.S. PATENT DOCUMENTS

| | | | |
|---|---|---|---|
| 5,999,517 A * | 12/1999 | Koning et al. ............... | 370/255 |
| 6,339,595 B1 | 1/2002 | Rekhter et al. | |
| 6,584,093 B1 | 6/2003 | Salama et al. | |
| 6,813,644 B1 | 11/2004 | Jamieson et al. | |
| 6,938,095 B2 | 8/2005 | Basturk et al. | |
| 6,999,454 B1 * | 2/2006 | Crump ........................ | 370/389 |
| 7,136,374 B1 | 11/2006 | Kompella | |
| 7,274,704 B1 | 9/2007 | Ould-Brahim et al. | |
| 2001/0032272 A1 | 10/2001 | Fujita | |
| 2002/0080798 A1 | 6/2002 | Hariguchi et al. | |
| 2002/0184388 A1 * | 12/2002 | Yaseen et al. ................ | 709/242 |
| 2002/0191541 A1 * | 12/2002 | Buchanan et al. ........... | 370/230 |
| 2004/0037275 A1 * | 2/2004 | Li et al. ....................... | 370/370 |
| 2004/0081154 A1 * | 4/2004 | Kouvelas ..................... | 370/392 |
| 2005/0094566 A1 * | 5/2005 | Hares .......................... | 370/238 |
| 2005/0097146 A1 * | 5/2005 | Konstantinou et al. ...... | 707/200 |
| 2005/0182756 A1 * | 8/2005 | Eppley et al. ................... | 707/3 |
| 2005/0198382 A1 * | 9/2005 | Salmi et al. ................. | 709/240 |
| 2006/0029035 A1 * | 2/2006 | Chase et al. ................ | 370/351 |
| 2006/0209716 A1 * | 9/2006 | Previdi et al. ............... | 370/254 |

OTHER PUBLICATIONS

Chen et al., "Cooperative Route Filtering Capability for BGP-4," Aug. 2003, Network Working Group, Internet Draft 10, URL: http://tools.ietf.org/html/draft-ietf-idr-route-filter-10.*
Network Working Group, RFC: 2547, "BGP/MPLS VPNs", Mar. 1999, pp. 1-25, www.ietf.org/rfc/rfc2547.txt?number=2547.
Network Working Group, Internet Draft, "Cooperative Route Filtering Capability for BGP-4," Aug. 2003, retrived form internet, URL http://tools.ietf.org/html/draft-ietf-idr-route-filter-09.

* cited by examiner

*Primary Examiner*—Ayaz R Sheikh
*Assistant Examiner*—Timothy J Weidner
(74) *Attorney, Agent, or Firm*—BainwoodHuang (57) ABSTRACT

A method for scaling hierarchical route reflectors (RRs) using automated Outbound Route Filtering (ORF) is presented. A first route reflector identifies other route reflectors configured as Route reflector clients within a route reflector hierarchy. The first route reflector then builds a common set of route target filters received from the client route reflectors and sends the common set of route target filters to client route reflectors.

9 Claims, 5 Drawing Sheets

PRIOR ART

METHOD TO SCALE HIERARCHICAL ROUTE REFLECTORS USING AUTOMATED OUTBOUND ROUTE FILTERING-LIST MECHANISM

BACKGROUND

The Border Gateway Protocol (BGP) is an interautonomous system routing protocol. An autonomous system (AS) is a network or group of networks under a common administration and with common routing policies. BGP is used to exchange routing information for the Internet and is the protocol used between Internet Service Providers (ISPs). Customer networks usually employ an Interior Gateway Protocol (IGP) such as Routing Interior Protocol (RIP), which specifies how routers exchange routing table information. With RIP, routers periodically exchange entire tables. Another IGP is known as Open Shortest Path First (OSPF) protocol. In OSPF the routers use link-state algorithms to send routing information to all nodes in an internetwork by calculating the shortest path to each node based on a topography of the network constructed by each node. Each router sends the particular portion of the routing table that describes the state of its own links, and it also sends the complete routing structure (topography). An advantage of OSPF is that it results in smaller more frequent updates everywhere. The updates converge quickly, thus preventing such problems as routing loops and Count-to-Infinity (when routers continuously increment the hop count to a particular network). This makes for a more stable network.

Customers connect to ISPs, and ISPs use BGP to exchange customer and ISP routes. When BGP is used between autonomous systems the protocol is referred to as External BGP (EBGP). If a service provider is using BGP to exchange routes within an AS, then the protocol is referred to as Interior BGP (IBGP). BGP neighbors exchange full routing information when the TCP connection between neighbors is first established. When changes to the routing table are detected, the BGP routers send to their neighbors only those routes that have changed. BGP routers do not send periodic routing updates, and BGP routing updates advertise only the optimal path to a destination network.

BGP uses many route parameters to define routing policies and maintain a stable routing environment. Routes learned via BGP have associated properties (also referred to as attributes) that are used to determine the best route to a destination when multiple paths exist to a particular destination. These attributes include: Weight, Local Preference, Multi-Exit Discriminator, Origin, AS_Path, Next Hop and Community.

BGP also has mechanisms such as Outbound Route Filtering (ORF) which enable the proper set of Virtual Private Network (VPN) routing distribution constraints to be dynamically distributed. This reduces the management burden of setting up the constraints, and results in improved scalability.

Within a single routing domain it is common to have the IBGP routers peer directly with one or two route reflectors (described below), rather than having them peer directly with each other. This greatly reduces the number of IBGP adjacencies which any one router must support. Further, a route reflector does not merely redistribute routing information, it "digests" the information first, by running its own decision processes. Only routes which survive the decision process are redistributed.

A route reflector reflects routes between the two groups: client peers and all the other routers in the autonomous system (non-client peers). The route reflector and its client peers form a cluster. The non-client peers are fully meshed with each other, but the client peers need not be fully meshed. When the route reflector receives an advertised route from an external BGP speaker, the route is advertised to all clients and non-client peers. When the route reflector receives an advertised route from a non-client peer, the route is advertised to all clients. When the route reflector receives a route from a client, the route is advertised to all clients and non-client peers. Hence, the clients need not be fully meshed.

As a result, when route reflectors are used, the amount of routing information carried around the network, and in particular, the amount of routing information which any given router must receive and process, is greatly reduced. This greatly increases the scalability of the routing distribution system.

An Automated ORF-list mechanism that provides the ability to filter routes at the Route Reflector (RR) is described in co-pending patent application No. 10/855769, filed May 27, 2004, titled AUTOMATIC ORF-LIST CREATION FOR ROUTE PARTITIONING ACROSS BGP ROUTE REFLECTORS, the disclosure of which is incorporated by reference herein. The result of the mechanisms described in the above-identified co-pending application number is the aggregation of route filters (ORF lists) at the RRs and the scaling of Provider Edge (PE) routers through filtering of unwanted route information. This filtering is done by the RRs by not advertising unwanted routes to the PEs.

SUMMARY

Conventional mechanisms such as those explained above suffer from a variety of deficiencies. The ability to filter routes at the RR level has been useful, however such a mechanism imposes a restriction of a single route-reflection hierarchy. The RRs still end up storing all the routes received from their clients. As the RR hierarchy grows, each RR located higher in the hierarchy ends up storing a lot of routes (complete view of an AS and its transit routes if any). This is so because the Automated ORF-list filtering works from the PE (RR-Client) to RR and not vice versa.

Embodiments of the invention significantly overcome such deficiencies and provide mechanisms and techniques that provide a method to scale hierarchical route reflectors using an automated ORF-list mechanism. The present invention identifies RRs which are in turn configured as RR-Clients within a RR hierarchy and defines rule-sets to perform RR to RR filtering, thereby allowing the higher level RRs in the hierarchy to prune unwanted route information.

In one embodiment a method and rulesets for ORF-lists is extended so as to perform VPN route filtering between RRs. This proposed VPN route filtering takes place at an RR which is higher up in the RR hierarchy and another RR, which is a client of the higher RR. Each BGP RR explicitly configures some of its IBGP neighbors as RR-Clients (clients). This allows an RR to distinguish its IBGP neighbors from its IBGP neighbors who are clients. Furthermore, each RR knows about itself, whether it is an RR or not. Using a new BGP capability, each RR advertises to all its peers that it is an RR router. With the new information from the new BGP capability, each RR knows which of its peers are in turn RRs, and which of its peers are not RRs. From information obtained from its configuration, each RR knows which of its peers are its clients, and which of its peers are not its clients. The above two pieces of information assists a BGP speaker in identifying which of its peers is an RR, and, in addition, which of its peers are its clients. Once this is established, the rule-sets defined in conventional mechanisms such as those described above are modified. An RR creates a common set of Route Target filters received from its all clients. The RR then sends the common set of filters to all its clients, who are also RRs.

The mechanism described above provides an RR the ability to recognize which of its clients are in turn RRs in a lower level hierarchy. This way, an RR higher in the hierarchy can distinguish its clients into two groups—those which are RRs and those which are not RRs. Announcing Route Target filters to its lower level RRs, assists the higher level RRs to limit their BGP VPN routing table to only the required set of routes thus pruning unwanted routes.

In a particular embodiment of a method for providing a method of scaling hierarchical route reflectors (RRs) using automated Outbound Route Filtering (ORF) The method includes identifying, by a first RR, other RRs configured as RR clients within a route reflector hierarchy. Once this is done, a common set of route target filters received from the client RRs is built by the first RR. The first RR then sends the common set of route target filters to the RR clients which results in the higher level RRs limiting their BGP VPN routing table to only the required set of routes.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides a method of scaling hierarchical route reflectors (RRs) using automated Outbound Route Filtering (ORF) as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing a method of scaling hierarchical route reflectors (RRs) using automated Outbound Route Filtering (ORF) as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

By way of the present method of scaling hierarchical route reflectors (RRs) using automated Outbound Route Filtering the rulesets for ORF-lists are extended so as to perform VPN route filtering between RRs. This proposed VPN route filtering happens between an RR which is higher up in the RR hierarchy and another RR, which is a client of the higher RR. Each BGP RR explicitly configures some of its IBGP neighbors as RR-clients. This allows an RR to distinguish its IBGP neighbors from its IBGP neighbors who are clients. Furthermore, each RR knows about itself, whether it is an RR or not. Using a new BGP capability, each RR advertises to all its peers that it is an RR router. With the new information from the new BGP capability, each RR knows which of its peers are in turn RRs, and which of its peers are not RRs. From information obtained from its configuration, each RR knows which of its peers are its clients, and which of its peers are not its clients. Once this is established, an RR creates a common set of Route Target filters received from its all clients. The RR then sends the common set of filters to all its clients, who are also RRs.

The mechanism described above provides an RR the ability to recognize which of its clients are in turn RRs in a lower level hierarchy. This way, an RR higher in the hierarchy can distinguish its clients into two groups—those which are RRs and those which are not RRs. Announcing Route Target filters to its lower level RRs, assists the higher level RRs to limit their BGP VPN routing table to only the required set of routes thus pruning unwanted routes.

Figure 1:
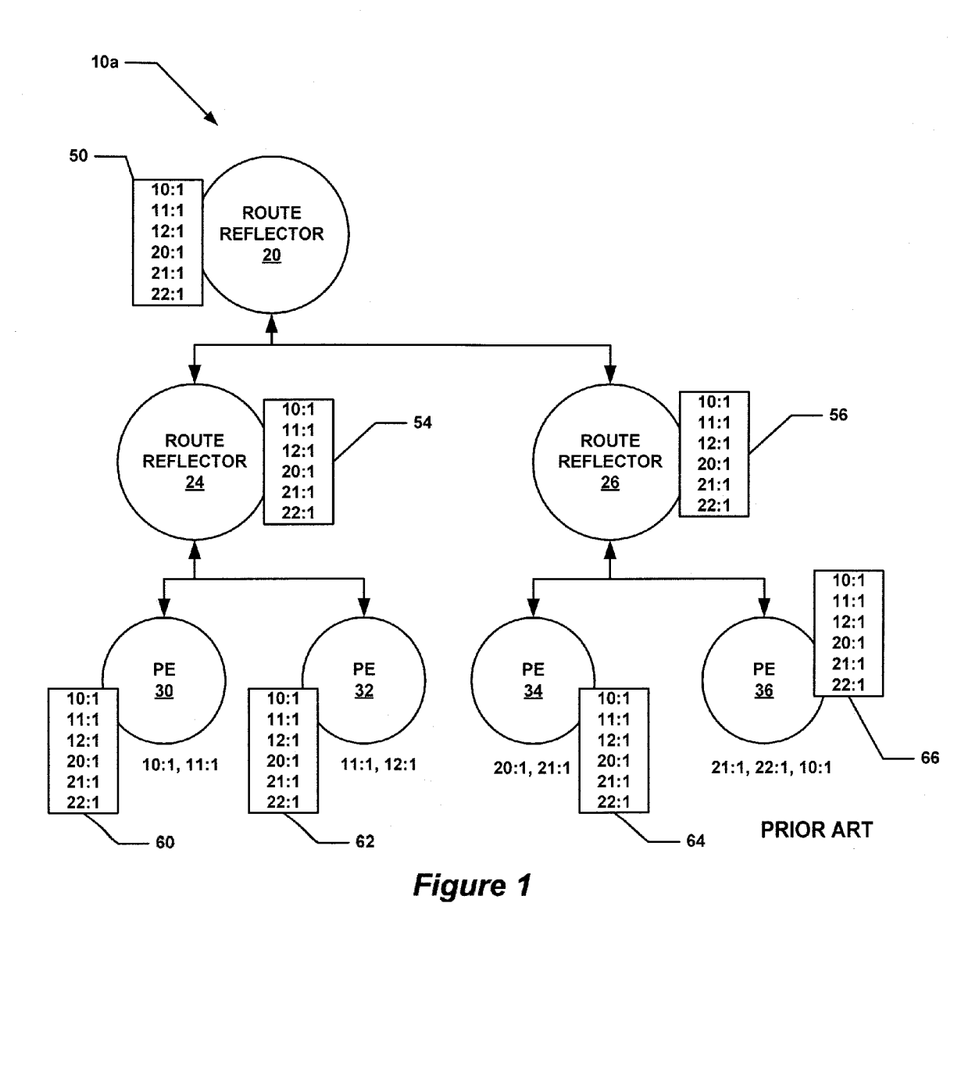
FIG. 1 comprises a block diagram of a conventional network environment.

Referring now to FIG. 1, a conventional environment 10*a* is shown. The environment includes RRs 20, 24 and 26. RR 20 is in communication with RRs 24 and 26, and RRs 24 and 26 are in communication with each other. RR 24 is also in communication with Provider Edge (PE) router 30 and PE router 32, RR 26 is in communication with PE 34 and PE 36.

A route reflector may have client and non-client peers. A client may be a provider router, and a non-client peer may be another route reflector. On receipt of ORF entries a route reflector may build an outbound route filter (also referred to as a filter list) toward the advertising peer. Outbound Route Filtering (ORF) provides a BGP-based mechanism that allows a router to send to its BGP peers a set of route filters that the peer may use to constrain/filter its outbound routing updates toward the advertising peer. PE-routers advertise ORF messages to route reflectors and the content of the ORFs may be used to filter the routes advertised by route reflectors to PE-routers.

An ORF list is a union of all ORF-entries that have been received from clients and ORF lists received from client or non-client peers. An ORF list is only sent to non-client peers of the route reflector unless specifically configured otherwise (such as in the case of an ASBR-router). In this environment 10*a*, PE 30 is interested in addresses having a prefix of 10:1 and 11:1. PE 32 is interested in addresses having a route-target of 11:1 and 12:1. Similarly, PE 34 is interested in routes having a route-target of 20:1 and 21:1 while PE 36 is interested in addresses having a route-target of 21:1, 22:1 and 10:1. It should be noted that only a few routing prefixes are shown for explanation purposes, and that any number of routers and prefixes could be used. These routes are advertised to all the routers. Thus, each PE router stores all the routes in its routing table (RT). RT 64 for PE 30 includes all the routes, as does RT 62 of PE 32, RT 64 of PE 64 and RT 66 of PE 36. All the routes are stored in each router, even if there is no interest in the routes. For example, PE 30 has no interest in RT entries 12:1, 20:1, 21:1 and 22:1 even though RT 64 includes them. This is a waste of space and processing power for each router.

Figure 2:
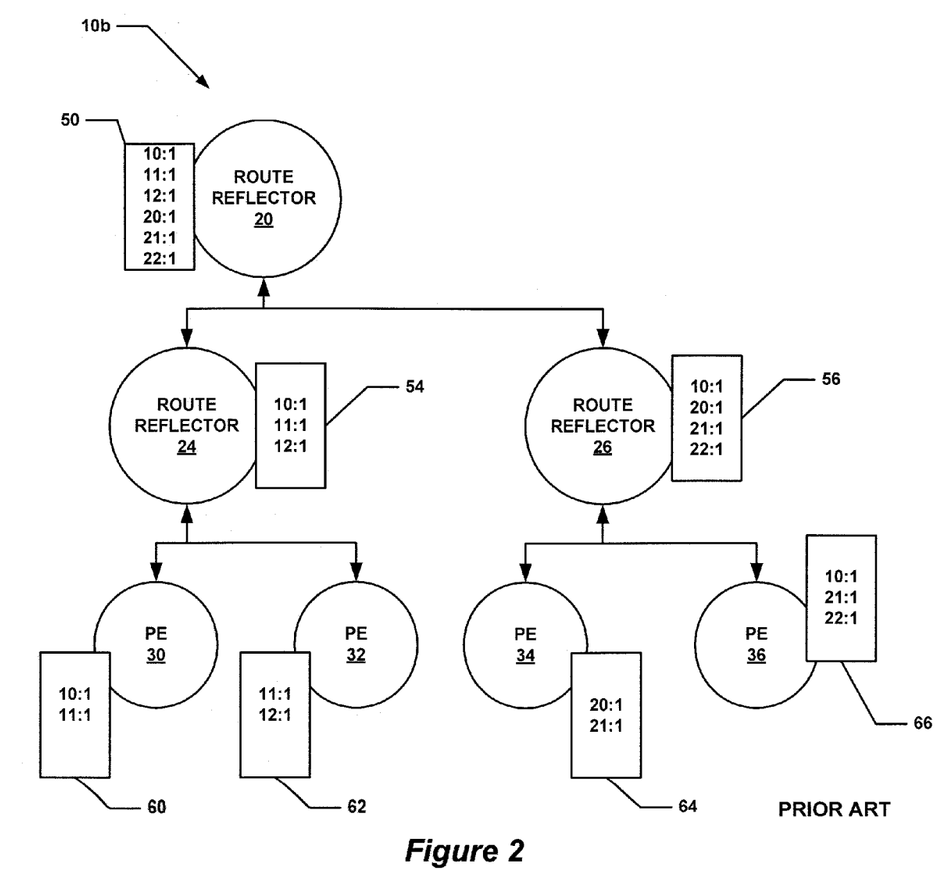
FIG. 2 comprises a block diagram of the conventional network environment of FIG. 1 which further provides automatic ORF-list creation for route partitioning across BGP route reflectors.

Referring now to FIG. 2, a similar environment 10*b* is shown. In this environment automatic ORF-list creation for route partitioning across BGP route reflectors has been implemented. As a result, a PE can tell a RR what RT entries it is interested in, so that the RR will build a filter list such that only these routes are directed to the PE. For example, RR 24 sends only entries having the prefix 10:1 and 11:1 to PE 30. Similarly, RR 24 sends only entries for 11:1 and 12:1 to PE 32. Thus, the RR 24 filter list 54 only needs to contain the entries for 10:1, 11:1 and 12:1. This results in less processing and resources required for RR 24. The same scenario exists for RR 26. RR 26 sends only entries having the prefix 20:1 and 21:1 to PE 34. Similarly, RR 26 sends only entries for 21:1, 22:1 and 10:1 to PE 36. Thus, the filter list 56 of RR 26 only needs to contain the entries for 10:1, 20:1, 21:1 and 22:1. Note however, the filter list 50 of RR 20 has not changed, and still contains entries for all the routes.

Figure 3:
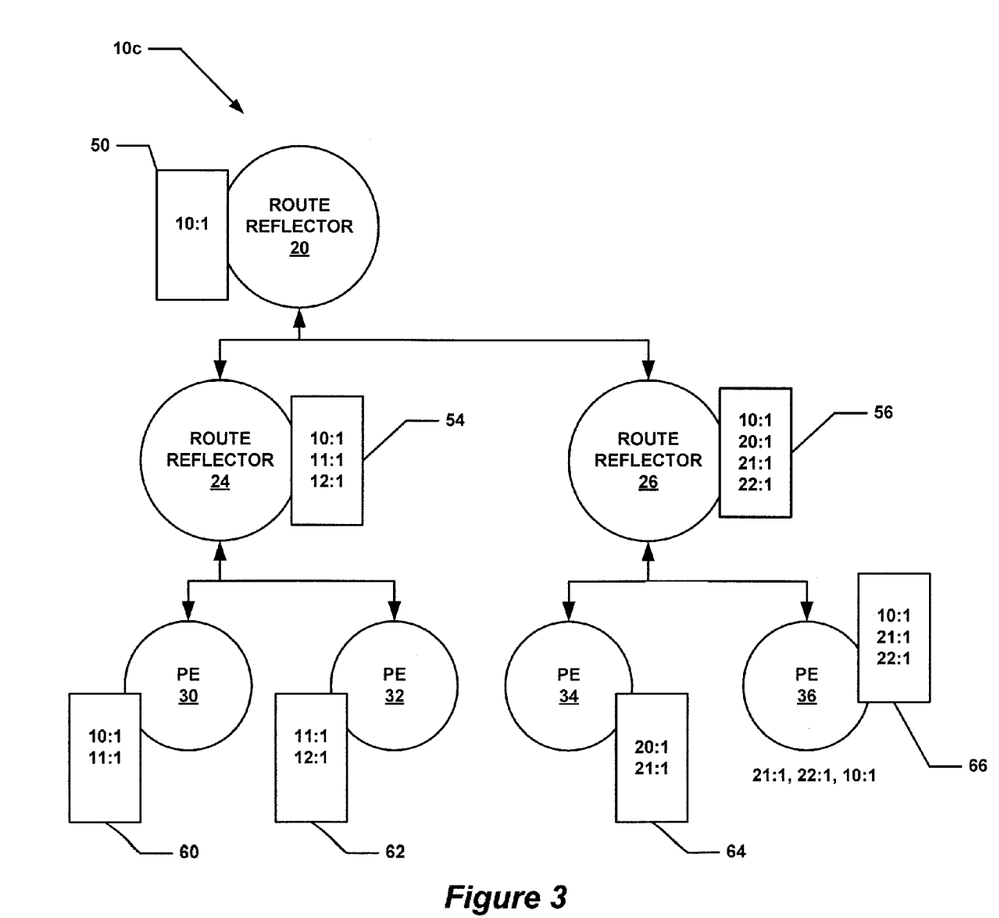
FIG. 3 comprises a block diagram of a particular embodiment of a network environment utilizing a method of scaling hierarchical route reflectors (RRs) using automated Outbound Route Filtering (ORF Outbound Route Filtering in accordance with embodiments of the present invention.

Referring now to FIG. 3, an environment 10*c* is shown in which scaling hierarchical route reflectors (RRs) using automated Outbound Route Filtering (ORF) is performed. The function of RR 20 is to convey routing information from RR 24 to RR 26 and from RR 26 to RR 24. There is only one entry of common interest between RRs 24 and 26 (entry 10:1). The other routes are of no interest to either RR 24 or RR 26 so RR 20 does not need to send them. By way of the present invention, if one RR is a peer of another RR, and if the other RR is also a client of the first RR, then the first RR can advertise its filter list to the client RR. RR 24 and RR 26 are RR-clients of RR 20. RR 20 builds an intersection of the two filter lists 54 and 56. RR 20 advertises this filter list to RR 24 and RR 26, in effect notifying then to only send routes having a prefix of 10:1. As a result, RR 24 will not send routes having a prefix of 11:1 and 12:1 to RR 20, and RR 26 will not send routes of 20:1, 21:1, 22:1 to RR 20. Accordingly, the load on RR20 is reduced as it now only needs to store routes for 10:1.

Figure 4:
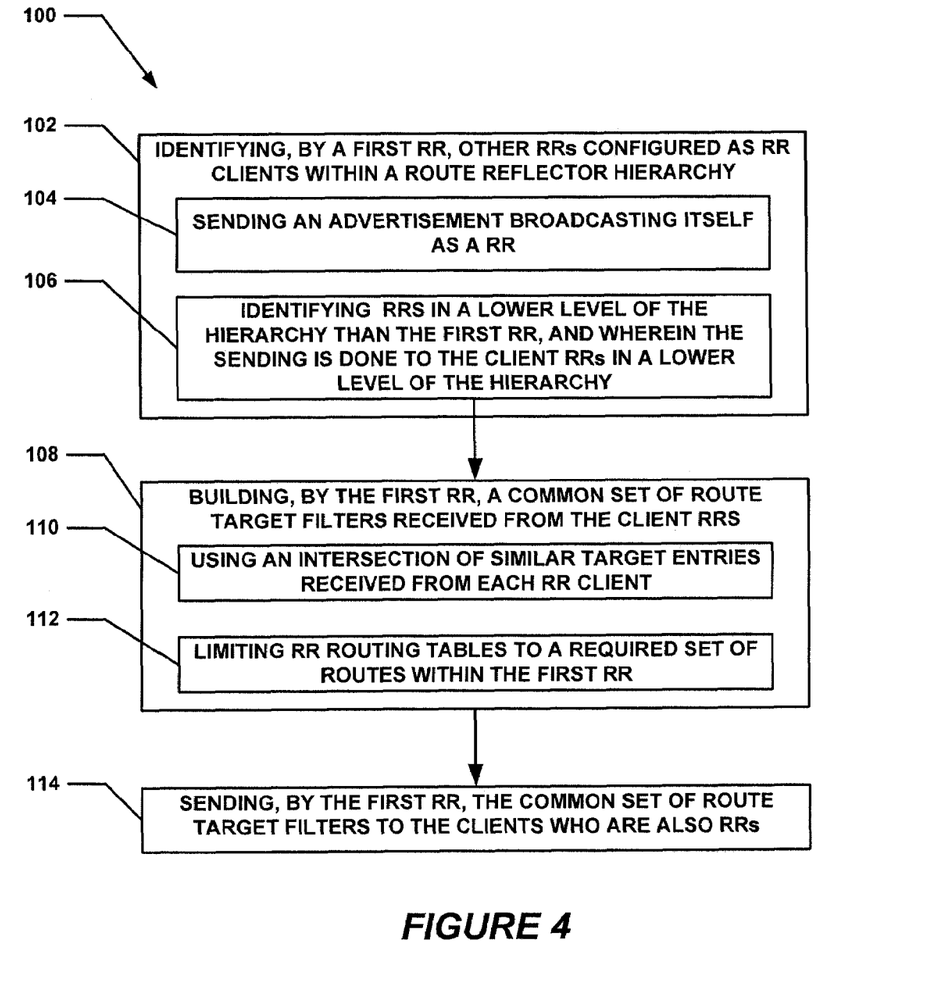
FIG. 4 comprises a flow diagram of a particular embodiment of a method of scaling hierarchical route reflectors (RRs) using automated Outbound Route Filtering (ORF)

A flow chart of one embodiment of the presently disclosed method is depicted in FIG. 4. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 4, a method 100 of scaling hierarchical RRs using automated ORF is shown. The method 100 begins with processing block 102, wherein a first RR identifies other RRs configured as RR clients within a route reflector hierarchy.

In processing block 104, an advertisement is sent by the first RR broadcasting itself as a RR. As shown in processing block 106 the sending further comprises identifying RRs in a lower level of the hierarchy than the first RR, and wherein the sending is done to the RR clients in a lower level of the hierarchy.

In processing block 108, the first RR builds a common set of route target filters received from the client RRs. In processing block 110, the building of a common set of route target filters includes using an intersection of similar target entries received from each RR client. As shown in processing block 112, RR routing tables may be limited to a required set of routes within the first RR. In processing block 114, the first RR sends the common set of route target filters to the Client RRs.

Figure 5:
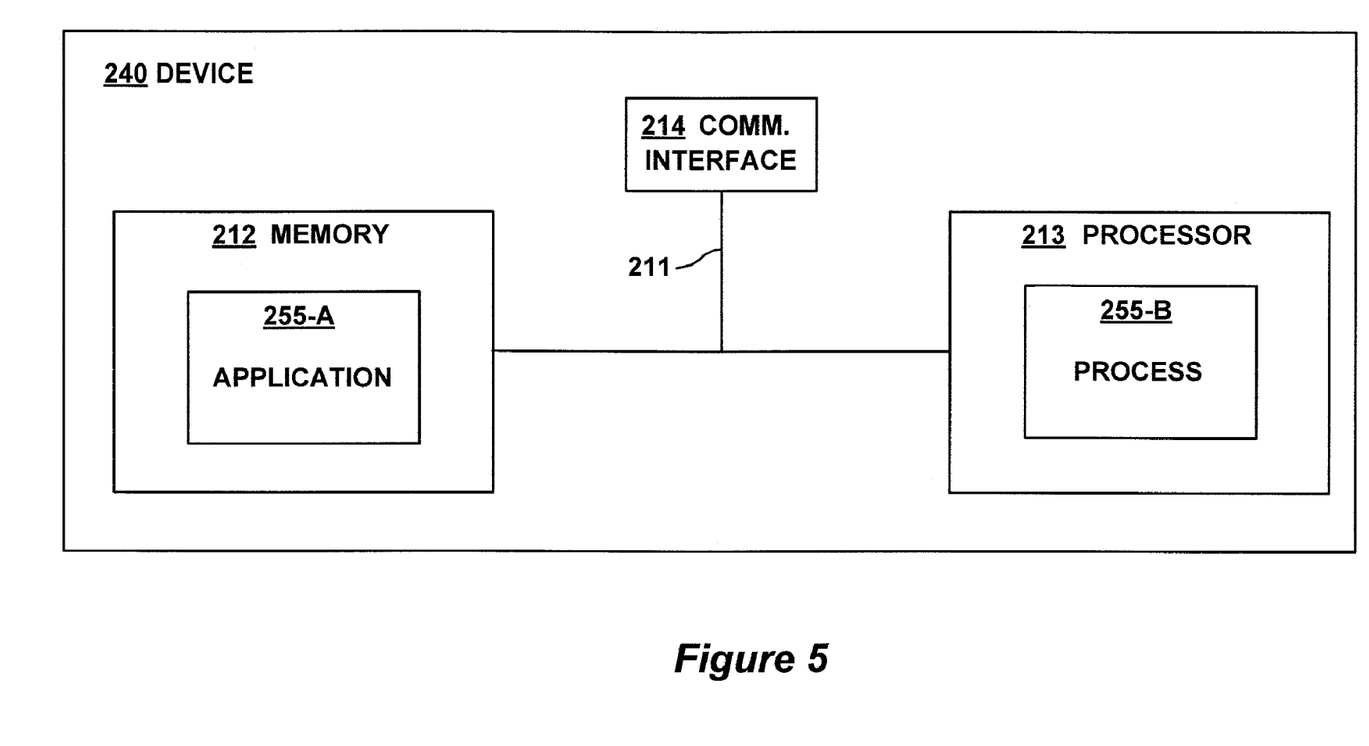
FIG. 5 illustrates an example computer system architecture for a computer system that performs a method of scaling hierarchical route reflectors (RRs) using automated Outbound Route Filtering (ORF) in accordance with embodiments of the invention.

FIG. 5 illustrates example architectures of a computer system that is configured as a host computer system 240. The computer system 240 may be any type of computerized system such as a personal computer, workstation, portable computing device, mainframe, server or the like. In this example, the system includes an interconnection mechanism 211 that couples a memory system 212, a processor 213, and a communications interface 214. The communications interface 214 allows the computer system 240 to communicate with external devices or systems.

The memory system 212 may be any type of computer readable medium that is encoded with an application 255-A that represents software code such as data and/or logic instructions (e.g., stored in the memory or on another computer readable medium such as a disk) that embody the processing functionality of embodiments of the invention as explained above. The processor 213 can access the memory system 212 via the interconnection mechanism 211 in order to launch, run, execute, interpret or otherwise perform the logic instructions of the applications 255-A in order to produce a corresponding process 255-B. In other words, the process 255-B represents one or more portions of the agent application 255-A performing within or upon the processor 213 in the computer system.

It is to be understood that embodiments of the invention include the applications (i.e., the un-executed or non-performing logic instructions and/or data) encoded within a computer readable medium such as a floppy disk, hard disk or in an optical medium, or in a memory type system such as in firmware, read only memory (ROM), or, as in this example, as executable code within the memory system 212 (e.g., within random access memory or RAM). It is also to be understood that other embodiments of the invention can provide the applications operating within the processor 213 as the processes. While not shown in this example, those skilled in the art will understand that the computer system may include other processes and/or software and hardware components, such as an operating system, which have been left out of this illustration for ease of description of the invention.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A method of scaling hierarchical route reflectors (RRs) using automated Outbound Route Filtering (ORF) comprising:
   identifying, by a first RR, other RRs configured as RR clients within a route reflector hierarchy wherein identifying by the first RR, other RRs configured as RR clients within the route reflector hierarchy comprises:
      identifying, of a set of peer devices, a set of RR devices and a set of non-RR devices, and
      identifying, of the set of peer devices, a set of client devices and a set of non-client devices,
      identifying the RR clients as belonging to both the set of RR devices and the set of client devices;
   building, by said first RR, a common set of route target filters received from said client RRs wherein building, by said first RR, the common set of route target filters received from said client RRs comprises:
      receiving, from each RR client, a filter list that includes routing information for the RR client,
      generating an intersection of similar target entries from the filter lists received from each RR client, the intersection of similar target entries including target entries common to all of the filter lists from the RR clients, and
      using the intersection of similar target entries received from each RR client; and
   sending, by said first RR, the common set of route target filters to said Client RRs wherein sending, by said first RR, the common set of route target filters to said client RRs comprises storing, by the first RR, the common set of route target filters as routing information.

2. The method of claim 1 wherein said sending further comprises limiting RR routing tables to a required set of routes within said first RR.

3. The method of claim 1 wherein said identifying comprises sending an advertisement broadcasting itself as a RR.

4. The method of claim 1 wherein said identifying further comprises identifying RRs in a lower level of the hierarchy than said first RR, and wherein said sending is done to said RR clients in a lower level of the hierarchy.

5. An apparatus providing scaling of hierarchical route reflectors (RRs) using automated Outbound Route Filtering (ORF) comprising:
   a first route reflector (RR);
   at least one client RR in communication with said first RR;
   at least one Provider Edge (PE) router in communication with said at least one client RR, and wherein said first RR builds a common set of route target filters received from said at least one client RR, and wherein said first RR sends the common set of route target filters to said Client RRs;
   wherein the first RR is configured to:
   identify, of a set of peer devices, a set of RR devices and a set of non-RR devices, identify, of the set of peer devices, a set of client devices and a set of non-client devices, and identify the RR clients as belonging to both the set of RR devices and the set of client devices;
   when building, by said first RR, the common set of route target filters received from said client RRs:
      receive, from each RR client, a filter list that includes routing information for the RR client,
      generate an intersection of similar target entries from the filter lists received from each RR client, the intersection of similar target entries including target entries common to all of the filter lists from the RR clients, and
      using the intersection of similar target entries received from each RR client; and
   when sending, by said first RR, the common set of route target filters to said client RRs, store, by the first RR, the common set of route target filters as routing information.

6. The apparatus of claim 5 wherein said first RR limits RR routing tables to a required set of routes within said first RR.

7. The apparatus of claim 5 wherein said first RR identifies itself by sending an advertisement broadcasting itself as a RR.

8. The apparatus of claim 5 wherein RRs in a lower level of the hierarchy than said first RR are identified, and wherein said first RR sends said common set of route target filters to said Client RRs in a lower level of the hierarchy.

9. A network scaling hierarchical route reflectors (RRs) using automated Outbound Route Filtering (ORF) comprising:
   a plurality of provider edge (PE) routers; and
   a plurality of route reflectors, wherein each route reflector is in communication with each other route reflector and wherein a first router reflector of said plurality of router reflectors identifies other route reflectors of said plurality of route reflectors as route reflector clients within a route reflector hierarchy, wherein each route reflector client is in communication with at least one of said plurality of PE routers, wherein said first router reflector builds a common set of route target filters received from said route reflector clients, and wherein said first route reflector sends the common set of route target filters to said client route reflectors;
wherein said first route reflector builds a common set of route target filters comprises said first route reflector using an intersection of similar target entries received from each RR client, the intersection of similar target entries including target entries common to all of the filter lists from the RR clients.

* * * * *

UNITED STATES PATENT AND TRADEMARK OFFICE
CERTIFICATE OF CORRECTION

PATENT NO. : 7,599,313 B2 Page 1 of 1
APPLICATION NO. : 11/117223
DATED : October 6, 2009
INVENTOR(S) : Patel et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1033 days.

Signed and Sealed this

Twenty-eighth Day of September, 2010

David J. Kappos
*Director of the United States Patent and Trademark Office*